US012788020B2

(12) United States Patent
Mucha et al.

(10) Patent No.: US 12,788,020 B2
(45) **Date of Patent: *Nov. 10, 2026**

(54) FOOD ITEM FORMATION APPARATUS AND METHODS OF USE

(71) Applicant: Daisy Makes, LLC, Kent, OH (US)

(72) Inventors: Amy Elizabeth Mucha, Kent, OH (US); Nathan Mucha, Kent, OH (US)

(73) Assignee: Daisy Makes, LLC, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/535,190

(22) Filed: Feb. 10, 2026

(65) Prior Publication Data

US 2026/0191208 A1 Jul. 9, 2026

Related U.S. Application Data

(63) Continuation of application No. 19/396,680, filed on Nov. 21, 2025, which is a continuation of application (Continued)

(51) Int. Cl.

*A21C 15/04* (2006.01)
*A21D 13/47* (2017.01)
*A47J 43/20* (2006.01)

(52) U.S. Cl.

CPC ............... *A21C 15/04* (2013.01); *A47J 43/20* (2013.01); *A21D 13/47* (2017.01)

(58) Field of Classification Search

None

See application file for complete search history.

(56) References Cited

U.S. PATENT DOCUMENTS 4,352,242 A * 10/1982 Plet ......................... B26B 27/00 30/316
4,765,029 A 8/1988 Rogan (Continued)

FOREIGN PATENT DOCUMENTS

| | | | |
|---|---|---|---|
| CN | 2754507 U | 2/2006 | |
| CN | 2754507 Y * | 2/2006 | |
| GB | 2423051 A * | 8/2006 | ............. B29B 11/00 |

OTHER PUBLICATIONS

@Brightoncutters, "I just love this sound," Instagram, Oct. 13, 2022, https://www.instagram.com/reel/CjrY7vcN8rZ.

(Continued)

*Primary Examiner* — Susan D Leong
*Assistant Examiner* — Xinwen Ye
(74) *Attorney, Agent, or Firm* — Master Key IP, LLP; Justin G. Sanders

(57) ABSTRACT

A food item formation apparatus is disclosed and configured for producing a plurality of uniformly shaped and sized food items from a relatively larger volume of food material. In at least one embodiment, the apparatus provides a cutter and an ejector. During use, with a first end of an at least one ejector body of the ejector slidably positioned within a corresponding at least one cutter body of the cutter, a cutting edge of a first end of the at least one cutter body may be pressed into the food material, forming at least one food item having a cutout shape corresponding to the shape of the cutting edge in cross-section, and a second end of the at least one ejector body may be subsequently pushed, causing an ejector surface of the at least one ejector body to eject the food item from the first end of the cutter body.

18 Claims, 9 Drawing Sheets

Related U.S. Application Data

No. 18/798,114, filed on Aug. 8, 2024, now Pat. No. 12,484,589.

(60) Provisional application No. 63/569,539, filed on Mar. 25, 2024.

(56) References Cited

U.S. PATENT DOCUMENTS

| | | | | | |
|---|---|---|---|---|---|
| 5,303,473 | A | 4/1994 | Sadler | | |
| 2006/0225579 | A1 * | 10/2006 | Errera | A47J 43/20 | 99/388 |
| 2008/0241326 | A1 * | 10/2008 | Ekberg | A21C 11/06 | 99/485 |
| 2011/0079155 | A1 * | 4/2011 | Ho | A47J 25/00 | 99/551 |
| 2012/0311874 | A1 * | 12/2012 | Rhoads | A47J 43/20 | 30/279.2 |
| 2021/0245917 | A1 * | 8/2021 | Evans | B65D 1/36 | |

OTHER PUBLICATIONS

@Brightoncutters, "Introducing our new Multi-cutter and Dough Popper system for tiny mini cookies," Instagram, Jan. 7, 2022, https://www.instagram.com/reel/CYcmYj7MMoZ.

Brighton, "Charming Heart Multi-Cutter," brightoncutters.com, Jul. 23, 2022, https://brightoncutters.com/collections/multi-cutters-and-poppers/products/charming-heart-multi-cutter?variant=39910917177379.

@Cookie.cutz, "Tiny 1"×28 bones multi cutter with pusher to easily push out the tiny dog bones—Just added to our 4 store," Instagram, Sep. 1, 2020, https://www.instagram.com/p/CEnRf7PAGDV.

* cited by examiner

FOOD ITEM FORMATION APPARATUS AND METHODS OF USE

RELATED APPLICATIONS

This is a continuation application and so claims the benefit pursuant to 35 U.S.C. § 120 of a prior filed and co-pending U.S. non-provisional patent application Ser. No. 19/396,680, filed on Nov. 21, 2025, which itself is a continuation of U.S. non-provisional patent application Ser. No. 18/798,114, filed on Aug. 8, 2024, (now U.S. Pat. No. 12,484,589, issued on Dec. 2, 2025), which claims priority pursuant to 35 U.S.C. § 119(e) to and is entitled to the filing date of U.S. provisional application Ser. No. 63/569,539, filed on Mar. 25, 2024. The contents of the aforementioned applications are incorporated herein by reference.

BACKGROUND

The subject of this provisional patent application relates generally to food, and more particularly to a food item formation apparatus and associated methods of use for producing a plurality of uniformly shaped and sized food items in a relatively more efficient manner.

Applicant hereby incorporates herein by reference any and all patents and published patent applications cited or referred to in this application.

By way of background, cake pops are currently made in a multi-step process. First, baked cakes are baked and processed into a dough-consistency with a mixer or food processor (sometimes with the addition of frosting to add moisture). The baker then forms the dough into the desired shape and size prior to dipping in chocolate and decorating. The forming is accomplished in a variety of ways including rolling between one's hands to form a sphere, pressing into a mold, or rolling into a sheet and cutting with a cookie cutter. Rolling and molding are the primary methods as traditional cookie cutters are not deep enough and it is difficult to remove complex cake pop dough shapes from the cutter without deforming the shape. Rolling and molding are both very slow processes which limit a baker's speed and ability to produce a large quantity of products. Current methods are difficult to accomplish without two hands including for people with limited mobility or use of both hands. Other methods do not cut as cleanly and formed shapes must be handled careful to avoid deforming. Similar issues are experienced with respect to mass producing other types of uniformly shaped and sized food items as well.

Thus, there remains a need for a faster, more efficient method for producing a plurality of uniformly shaped and sized food items in a relatively more efficient manner. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a food item formation apparatus configured for producing a plurality of uniformly shaped and sized food items from a relatively larger volume of food material. In at least one embodiment, a cutter provides at least one substantially tubular cutter body. Each of the at least one cutter body provides a cutter sidewall that extends substantially about a perimeter of said cutter body and defines an open first end and an opposing open second end of said cutter body, the first end and second end being in fluid communication with one another. The cutter sidewall defines a hollow cutout shape of said cutter body in cross-section which extends from the first end of said cutter body to the second end of said cutter body. The first end of said cutter body provides a cutting edge configured for cutting through the volume of food material. An ejector provides at least one elongate ejector body. Each of the at least one ejector body provides an ejector sidewall that extends substantially about a perimeter of said ejector body and terminates at a first end and an opposing second end of said ejector body. The ejector sidewall defines an ejector shape of said ejector body in cross-section which extends from the first end of said ejector body to the second end of said ejector, the ejector shape being substantially the same as the cutout shape of the corresponding at least one cutter body, thereby allowing the first end of said ejector body to be slidably inserted into the second end of the corresponding at least one cutter body. The first end of said ejector body provides an ejector surface oriented substantially transverse to the ejector sidewall. During use of the apparatus, with the first end of the at least one ejector body slidably positioned within the corresponding at least one cutter body, the cutting edge of the first end of the at least one cutter body may be pressed into the volume of food material, forming the at least one food item having the cutout shape, and the second end of the at least one ejector body may be subsequently pushed, causing the ejector surface to eject the food item from the first end of the cutter body.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
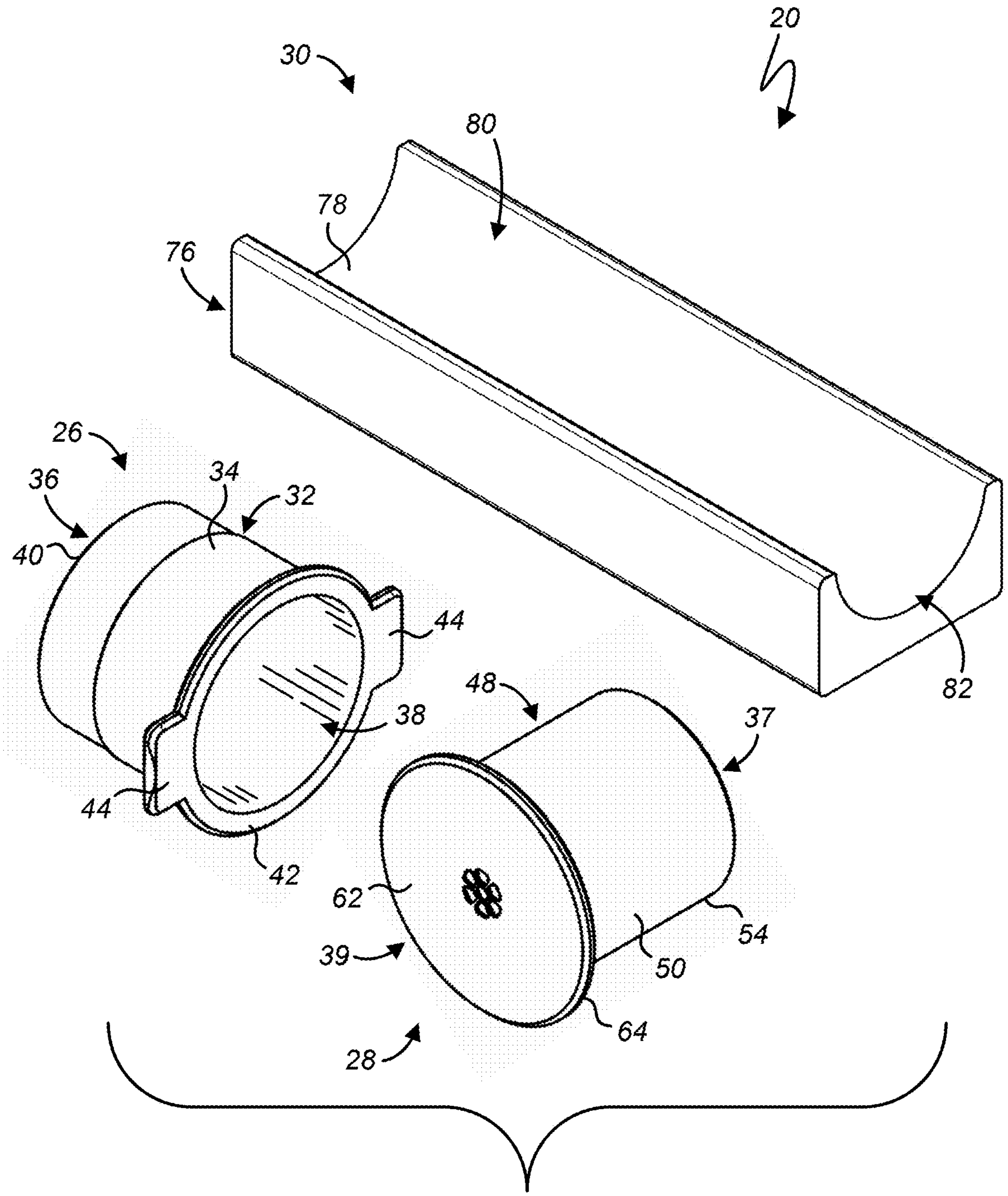
FIG. 1 is a perspective view of an exemplary food item formation apparatus, in accordance with at least one embodiment.

Turning now to FIG. 1, there is shown a perspective view of an exemplary food item 22 formation apparatus 20 configured for quickly and efficiently producing a plurality of uniformly shaped and sized food items 22 from a relatively larger volume of food material 24. At the outset, it should be noted that while the apparatus 20 is discussed in the context of producing cake pops for illustrative purposes, in further embodiments, the apparatus 20 may be utilized in the context of any other type of food item 22 where there exists a need for quickly and efficiently producing a plurality of uniformly shaped and sized food items 22. Thus, the present invention should in no way be limited to the cake pop context.

Figure 2:
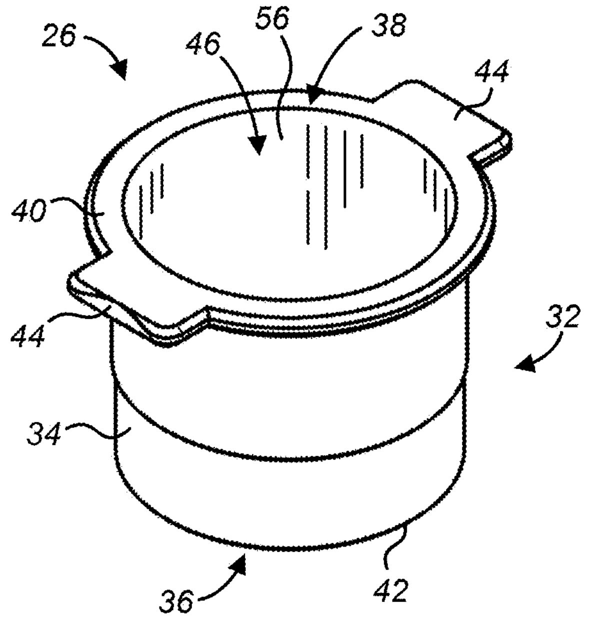
FIG. 2 is a perspective view of an exemplary cutter of the apparatus, in accordance with at least one embodiment.
Figure 5:
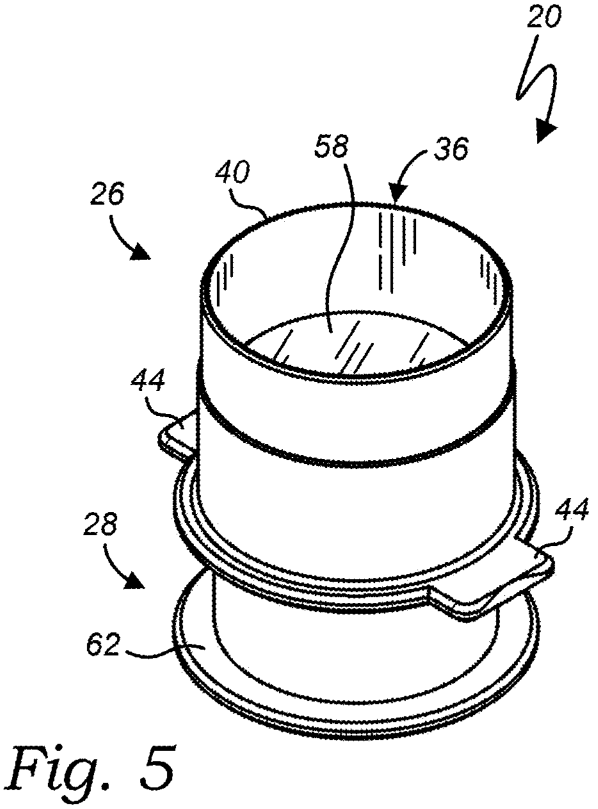
FIG. 5 is a perspective view of the ejector slidably inserted into the cutter, in accordance with at least one embodiment.

In at least one embodiment, the apparatus 20 provides a cutter 26, an ejector 28 and a tray 30. In at least one embodiment, as best illustrated in FIGS. 1 and 2, the cutter 26 provides an at least one substantially tubular (i.e., hollow) cutter body 32 having a cutter sidewall 34 that extends substantially about a perimeter of the cutter body 32 and defines an open first end 36 and an opposing open second end 38 of the cutter body 32, the first end 36 and second end 38 being in fluid communication with one another. In at least one embodiment, the cutter sidewall 34 extends continuously about the perimeter of the cutter body 32. In at least one alternate embodiment, the cutter sidewall 34 extends non-continuously about the perimeter of the cutter body 32. In at least one embodiment, the first end 36 of the cutter body 32 provides a cutting edge 40 configured for cutting through a relatively larger volume of food material 24 (such as a rolled out layer of dough, for example) as discussed further below, while the opposing second end 38 of the cutter body 32 provides a handle portion 42 configured for allowing the cutter 26 to be manually operated as also discussed further below. In at least one embodiment, as best illustrated in FIG. 5, the cutting edge 40 is beveled. In at least one embodiment, as best illustrated in FIGS. 2 and 5, the handle portion 42 is configured for leaving the open second end 38 of the cutter body 32 substantially unobstructed, the purpose for which is discussed further below. In at least one embodiment, the handle portion 42 provides an at least one handle tab 44 extending substantially perpendicularly from the cutter sidewall 34. In further embodiments, the handle portion 42 may take on any other sizes, shapes and/or configurations, now known or later developed—dependent at least in part on the context in which the apparatus 20 is to be used—so long as the apparatus 20 is capable of substantially carrying out the functionality described herein.

Figure 10:
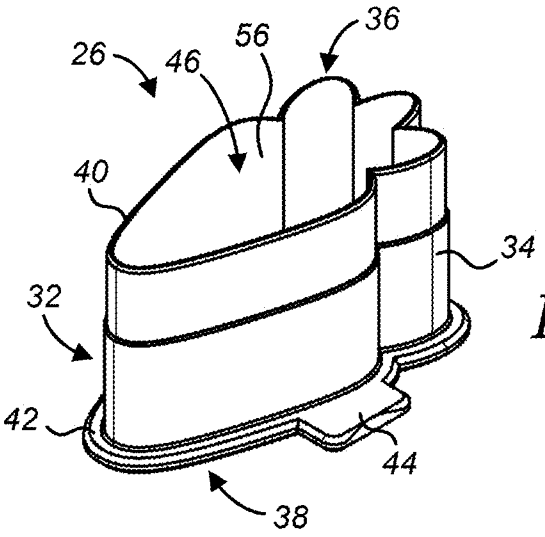
FIG. 10 is a perspective view of a further exemplary cutter of the apparatus, in accordance with at least one embodiment.

In at least one embodiment, the cutter sidewall 34 defines a hollow cutout shape 46 in cross-section which extends from the first end 36 of the cutter body 32 to the second end 38 of the cutter body 32. In other words, in at least one embodiment, each of the first end 36 (including the cutting edge 40) and second end 38 has the same cutout shape 46 in cross-section as the cutter sidewall 34. Thus, as illustrated best in FIGS. 6 and 8, the cutout shape 46 defines the shape of the food items 22 that the apparatus 20 is capable of producing, as discussed further below. In at least one embodiment, the cutout shape 46 is a circle. In at least one alternate embodiment, as best illustrated in FIG. 10, the cutout shape 46 is a carrot. In further alternate embodiments, the cutout shape 46 may be any other shape, now known or later developed, so long as the apparatus 20 is capable of substantially carrying out the functionality described herein. Accordingly, the cutout shape 46 should in no way be limited to one or more specific shapes.

Figure 3:
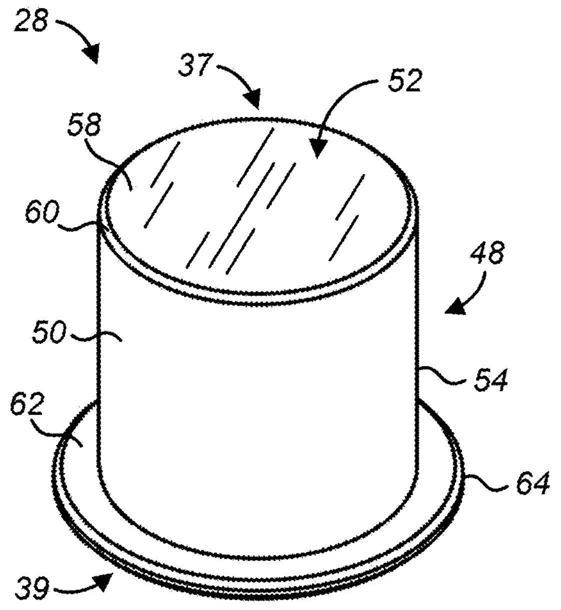
FIG. 3 is a perspective view of an exemplary ejector of the apparatus, in accordance with at least one embodiment.
Figure 6:
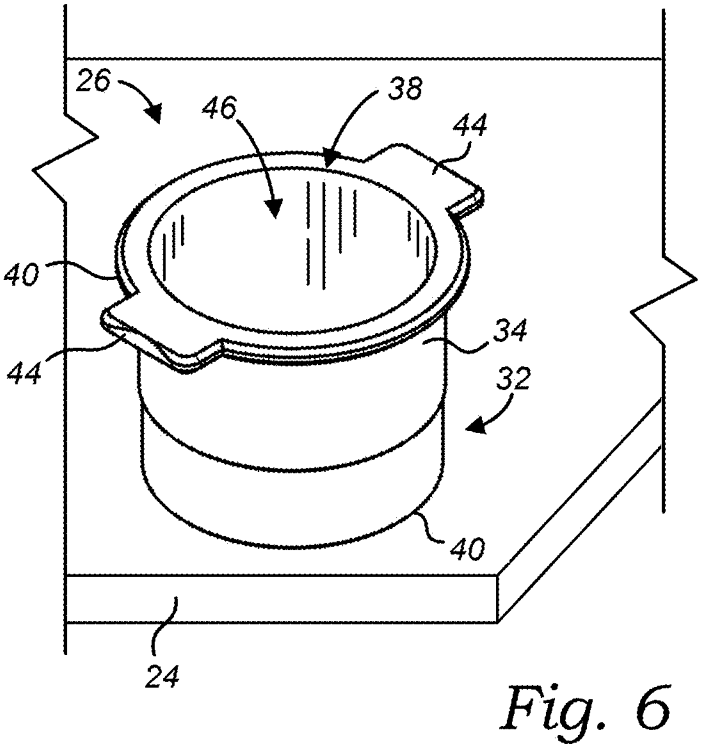
FIGS. 6-9 are perspective views illustrating an exemplary method for producing uniformly shaped and sized food items using the apparatus, in accordance with at least one embodiment.
Figure 7:
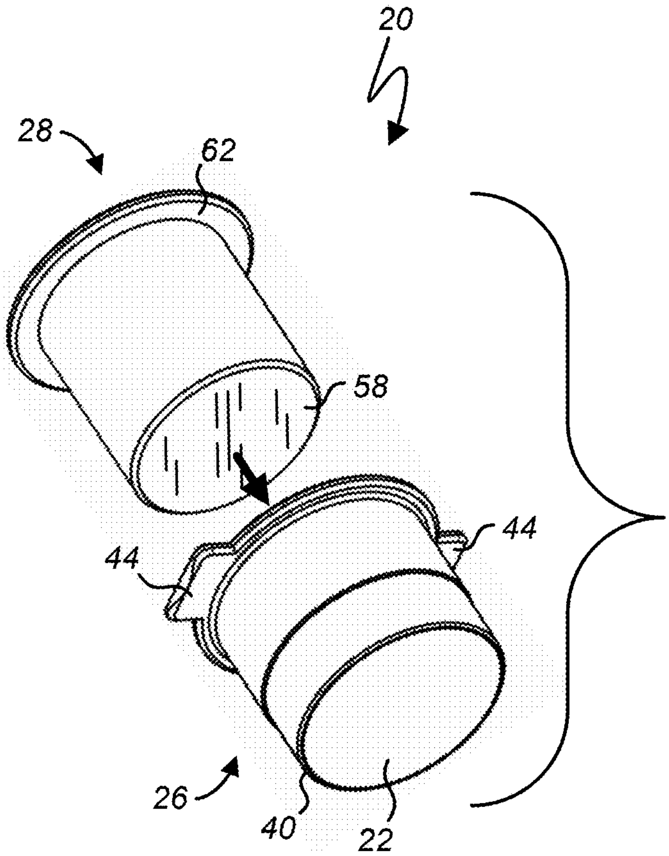
Figure 8:
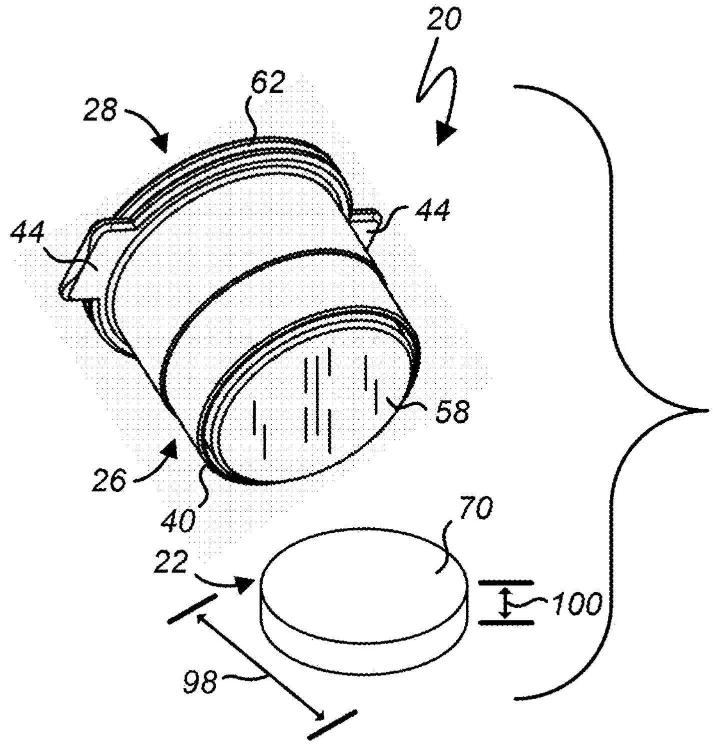

During use of the apparatus 20, when the cutting edge 40 of the first end 36 of the cutter body 32 is pressed into the volume of food material 24 (such as a rolled out layer of dough, for example), as illustrated in FIG. 6, the portion of food material 24 that is cut out of the volume of food material 24 (i.e., the food item 22) may remain positioned within the first end 36 of the cutter body 32, as illustrated in FIG. 7. Accordingly, in at least one embodiment, the ejector 28 is configured for assisting to dislodge and eject the food item 22 from the first end 36 of the cutter body 32, as illustrated in FIG. 8. In at least one embodiment, as best illustrated in FIG. 3, the ejector 28 provides an at least one elongate ejector body 48 having an ejector sidewall 50 that extends substantially about a perimeter of the ejector body 48 and terminates at a first end 37 and an opposing second end 39 of the ejector body 48. In at least one embodiment, the ejector sidewall 50 defines an ejector shape 52 in cross-section that is substantially the same as the cutout shape 46 of the corresponding cutter 26. Additionally, in at least one embodiment, the ejector sidewall 50 has an outer diameter (i.e., the largest distance between two laterally opposing points on an outer surface 54 of the ejector sidewall 50, given that the ejector shape 52 may be non-circular in at least one embodiment) that is relatively smaller than an inner diameter of the cutter sidewall 34 (i.e., the largest distance between two laterally opposing points on an inner surface 56 of the cutter sidewall 34, given that the cutout shape 46 may be non-circular in at least one embodiment). Accordingly, in at least one such embodiment, because the ejector shape 52 of the ejector sidewall 50 is substantially similar to the cutout shape 46 of the cutter sidewall 34, and because the outer diameter of the ejector sidewall 50 is smaller than the inner diameter of the cutter sidewall 34, the first end 37 of the ejector body 48 is configured for being slidably inserted into the second end 38 of the cutter body 32, as illustrated in FIGS. 5 and 7.

Figure 11:
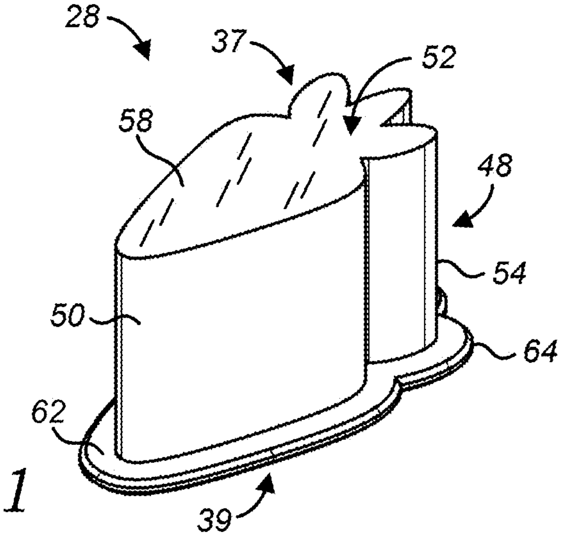
FIG. 11 is a perspective view of a further exemplary ejector of the apparatus, corresponding to the cutter of FIG. 10, in accordance with at least one embodiment.
Figure 12:
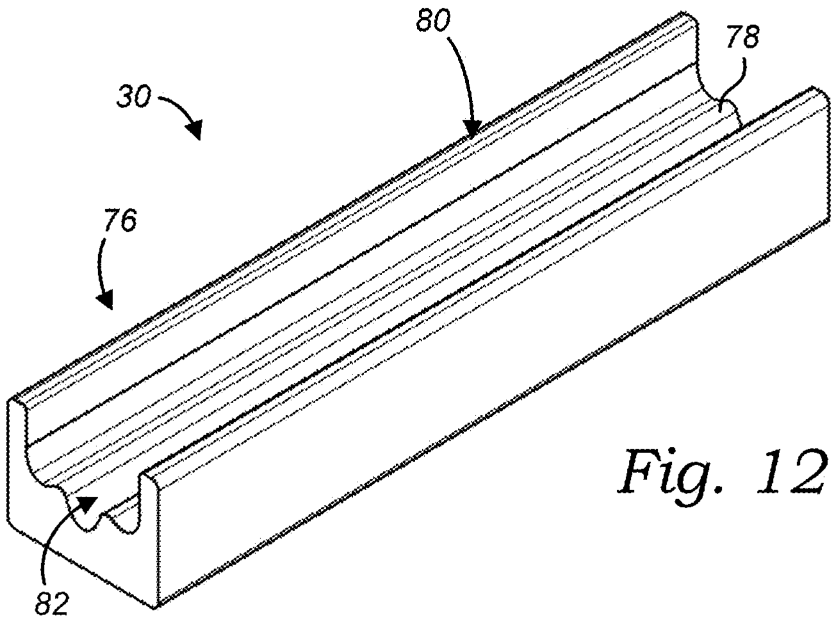
FIG. 12 is a perspective view of a further exemplary tray of the apparatus, corresponding to the cutter and ejector of FIGS. 10 and 11, respectively, in accordance with at least one embodiment.

In at least one embodiment, the first end 37 of the ejector body 48 provides an ejector surface 58 oriented substantially transverse to the ejector sidewall 50 and configured for coming into abutting contact with the food item 22 when the food item 22 is positioned within the first end 36 of the cutter body 32. In at least one embodiment, the ejector surface 58 has the same ejector shape 52 as the ejector sidewall 50 in cross-section. Thus, in such embodiments, the ejector sidewall 50 and ejector surface 58 cooperate to define an inverse form of the cutter sidewall 34 of the corresponding cutter 26—in other words the ejector shape 52 is a solid version of the hollow cutout shape 46 (approximating the size and shape of the cutout shape 46), thereby also substantially matching the cutout shape 46 of the food item 22. Accordingly, in at least one embodiment, the ejector shape 52 is a circle. In at least one alternate embodiment, as best illustrated in FIG. 11, the ejector shape 52 is a carrot. In further alternate embodiments, the ejector shape 52 may be any other shape, now known or later developed, so long as the apparatus 20 is capable of substantially carrying out the functionality described herein. Accordingly, the ejector shape 52 should in no way be limited to one or more specific shapes. Thus, in such embodiments, because the ejector shape 52 substantially matches the cutout shape 46 of the food item 22, the ejector surface 58 is able to more effectively dislodge and eject the entire food item 22 from the first end 36 of the cutter body 32 without damaging or deforming the food item 22 in the process. In at least one embodiment, as best illustrated in FIG. 3, the ejector body 48 provides a beveled transition surface 60 between the ejector sidewall 50 and ejector surface 58 for further assisting in dislodging and ejecting the entire food item 22 from the first end 36 of the cutter body 32 without damaging or deforming the food item 22 in the process.

In at least one embodiment, the second end 39 of the ejector body 48 provides an ejector base 62 oriented substantially transverse to the ejector sidewall 50 and configured for coming into abutting contact with the second end of the cutter body 32 when the first end 37 of the ejector body 48 is slidably inserted a distance into the second end 38 of the cutter body 32, as illustrated in FIG. 8. In at least one embodiment, the ejector base 62 has a base diameter (i.e., the largest distance between two laterally opposing points on a perimeter edge 64 of the ejector base 62, given that the ejector base 62 may be non-circular in at least one embodiment) that is relatively larger than the inner diameter of the cutter sidewall 34. Accordingly, the ejector base 62 is configured for acting as a physical stop for limiting a distance by which the first end 37 of the ejector body 48 may slidably travel through the cutter body 32 when dislodging and ejecting the food item 22 from the first end 36 of the cutter body 32. Additionally, in at least one embodiment, the ejector base 62 is configured for assisting the ejector body 48 in being manually pushed a distance through the cutter body 32. In at least one embodiment, the ejector base 62 has a shape that substantially matches the ejector shape 52 of the ejector sidewall 50 in cross-section, but having a relatively larger base diameter than the outer diameter of the ejector sidewall 50. In at least one alternate embodiment, the ejector base 62 has a shape that is different from the ejector shape 52.

In at least one embodiment, during use of the apparatus 20, with the first end 37 of the ejector body 48 slidably positioned within the cutter body 32, a user (such as a baker, for example) is able to press the cutting edge 40 of the first end 36 of the cutter body 32 into the volume of food material 24, which cuts a corresponding shape (matching the cutout shape 46 of the cutter sidewall 34) into the food material 24, thereby forming the food item 22, with the food item 22 remaining within the first end 36 of the cutter body 32. As the food material 24 is pressed into the first end 36 of the cutter body 32, the ejector surface 58 comes into contact with the food material 24, and the first end 37 of the ejector body 48 is pushed a corresponding distance out from the second end 38 of the cutter body 32. The user is able to subsequently push the ejector base 62 in order to slidably move the first end 37 of the ejector body 48 toward the first end 36 of the cutter body 32, thereby ejecting the food item 22 from the first end 36 of the cutter body 32. This process may be repeated as many times as desired, depending on the quantity of uniformly shaped and sized food items 22 the user wishes to produce using the apparatus 20. Thus, in at least one embodiment, the apparatus 20 is capable of producing a plurality of uniformly shaped and sized food items 22 in a relatively more efficient manner. Additionally, in at least one embodiment, the apparatus 20 can be operated with a single hand, which increases accessibility for users with and without disabilities, and can also be used to create complex shapes without deforming the food material 24 as it is cut and processed.

In at least one alternate embodiment, as illustrated in FIGS. 6 and 7, rather than the first end 37 of the ejector body 48 being slidably positioned within the cutter body 32 prior to the cutting edge 40 of the first end 36 of the cutter body 32 being pressed into the volume of food material 24, the first end 37 of the ejector body 48 being slidably inserted through the second end 38 of the cutter body 32 after the cutting edge 40 of the first end 36 of the cutter body 32 has been pressed into the volume of food material 24.

Figure 15:
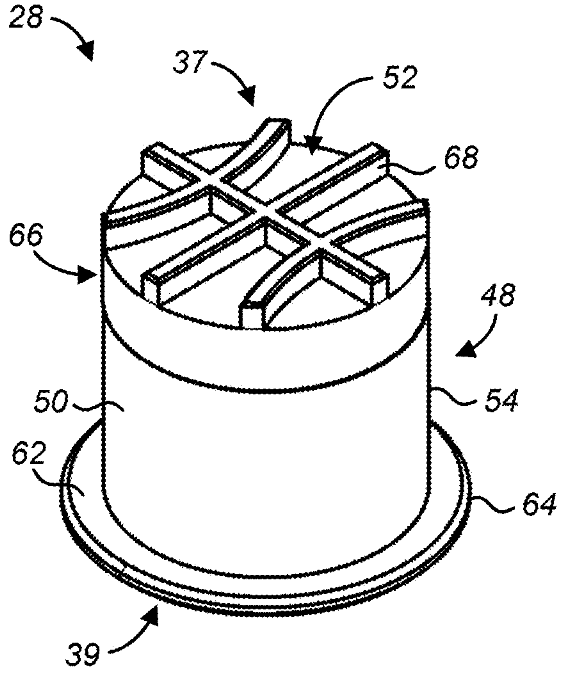
FIG. 15 is a perspective view of a further exemplary ejector of the apparatus, in accordance with at least one embodiment.
Figure 16:
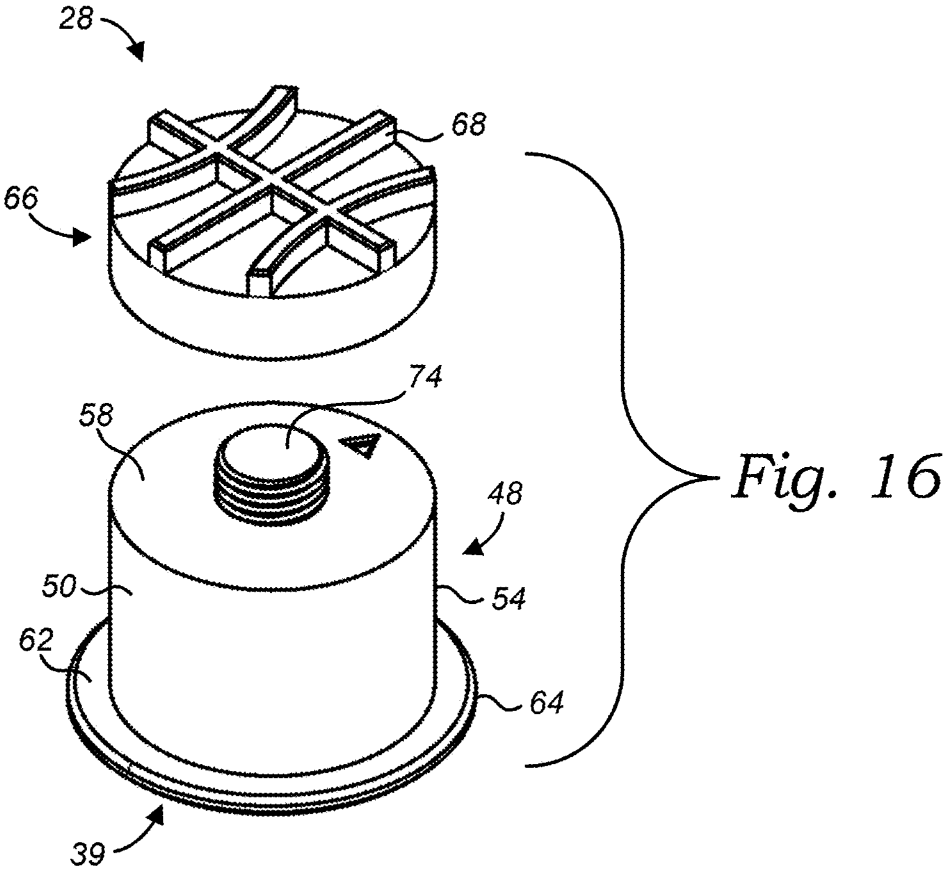
FIG. 16 is an exploded view of the ejector of FIG. 15, in accordance with at least one embodiment.
Figure 17:
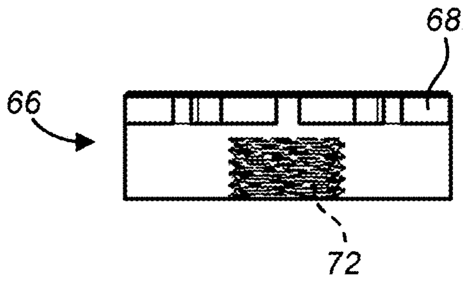
FIG. 17 is a side elevational view of an embossing head of the ejector of FIG. 15, in accordance with at least one embodiment.
Figure 18:
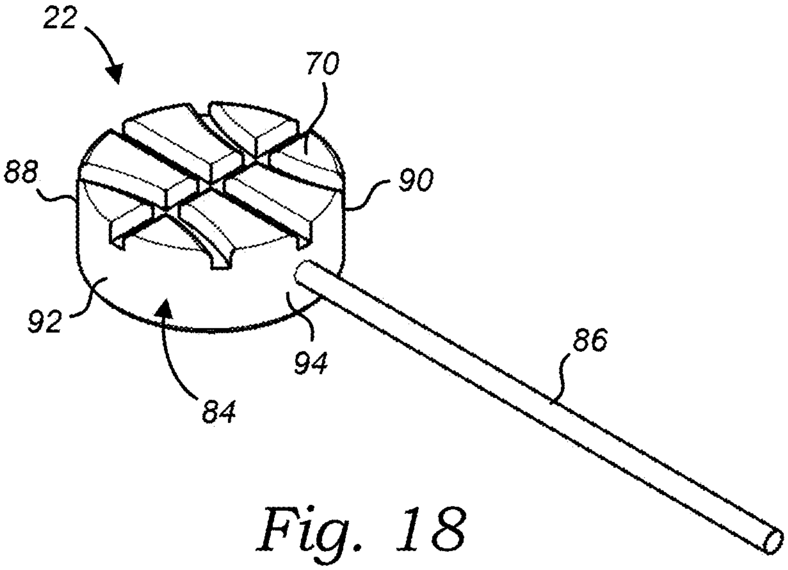
FIG. 18 is a perspective view of a food item that has been formed and embossed by the ejector of FIG. 15.

In at least one embodiment, as illustrated in FIG. 15, the ejector surface 58 provides an embossing member 66 configured for forming a raised and/or sunken design or relief (collectively referred to herein as a "surface design" 68 for simplicity purposes) on an upper surface 70 of the food item 22 (FIG. 18) during the above-discussed production of the food item 22 using the apparatus 20. In at least one embodiment, the embossing member 66 has the same shape as the ejector shape 52 of the ejector surface 58. In at least one such embodiment, the embossing member 66 is integral with the ejector surface 58. In at least one alternate embodiment, the embossing member 66 is removably engaged with the ejector surface 58, thereby allowing a variety of different embossing members 66 having different surface designs 68 to be selectively swapped in and out during use of the apparatus 20. In at least one such alternate embodiment, as illustrated in FIGS. 16 and 17, a first threaded member 72 provided by the embossing member 66 is threadably engageable with a corresponding second threaded member 74 provided by the ejector surface 58. In further such alternate embodiments, the embossing member 66 may be removably engaged with the ejector surface 58 using any other mechanisms or techniques, now known or later developed, capable of creating the necessary removable engagement therebetween. In that regard, it should be noted that the surface design 68 depicted in the drawings is merely exemplary and shown for illustrative purposes. In further embodiments, the surface design 68 may incorporate any design now known or later developed.

In at least one embodiment, during use of the apparatus 20, with the first end 37 of the ejector body 48 slidably positioned within the cutter body 32, as the cutting edge 40 of the first end 36 of the cutter body 32 is pressed into the volume of food material 24 in order to form the food item 22, the embossing member 66 forms the surface design 68 onto the upper surface 70 of the food item 22. In at least one embodiment, the surface design 68 may be further formed as the first end 37 of the ejector body 48 is subsequently moved toward the first end 36 of the cutter body 32 when ejecting the food item 22 from the first end 36 of the cutter body 32.

Figure 13:
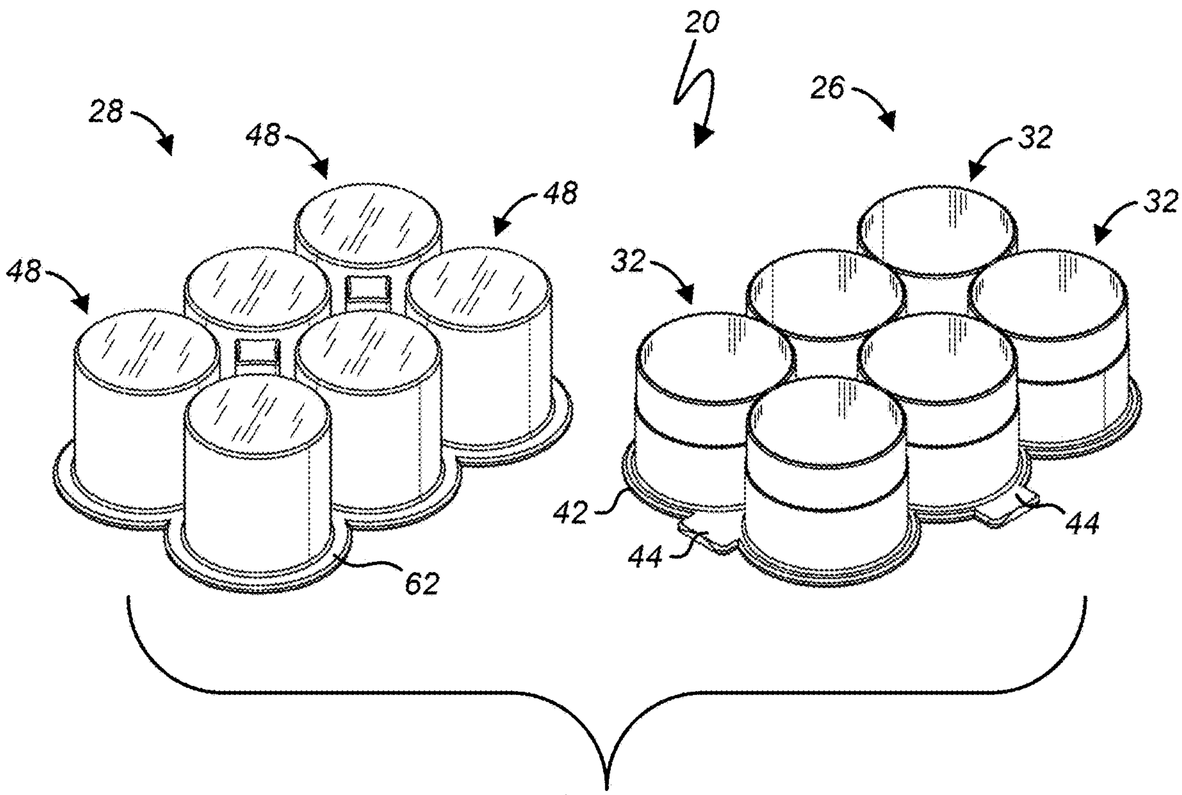
FIG. 13 is a perspective view of a further exemplary cutter and a corresponding ejector of the apparatus, in accordance with at least one embodiment.

In at least one embodiment, as illustrated in FIG. 13, the cutter 26 provides a plurality of cutter bodies 32 positioned in a side-by-side arrangement, while the ejector 28 provides a corresponding plurality of ejector bodies 48 positioned in a corresponding side-by-side arrangement, thereby allowing the apparatus 20 to produce a plurality of uniformly shaped and sized food items 22 simultaneously. In at least one embodiment, the cutout shape 46 and ejector shape 52 of each of the respective cutter bodies 32 and ejector bodies 48 is the same. In at least one alternate embodiment, the cutout shape 46 and ejector shape 52 of one or more of the respective cutter bodies 32 and ejector bodies 48 is different. It should be noted that in further embodiments, the cutter bodies 32 and corresponding ejector bodies 48 may take on any other sizes, shapes, dimensions, configurations, quantities and/or arrangements now known or later developed—dependent at least in part on the context in which the apparatus 20 is to be used—so long as the apparatus 20 is capable of substantially carrying out the functionality described herein.

Figure 4:
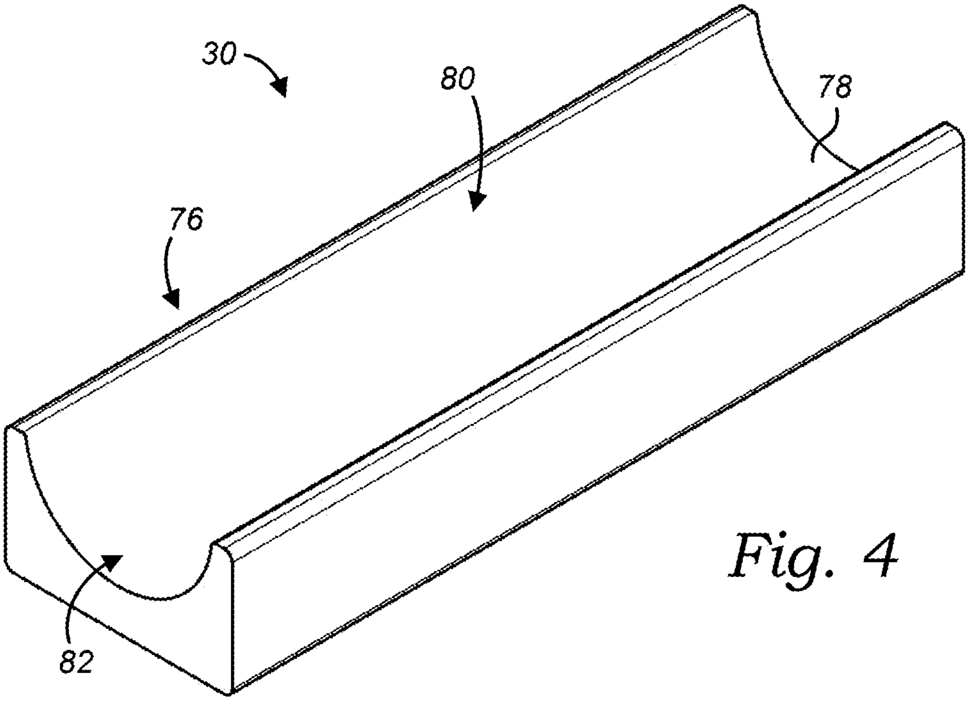
FIG. 4 is a perspective view of an exemplary tray of the apparatus, in accordance with at least one embodiment.
Figure 9:
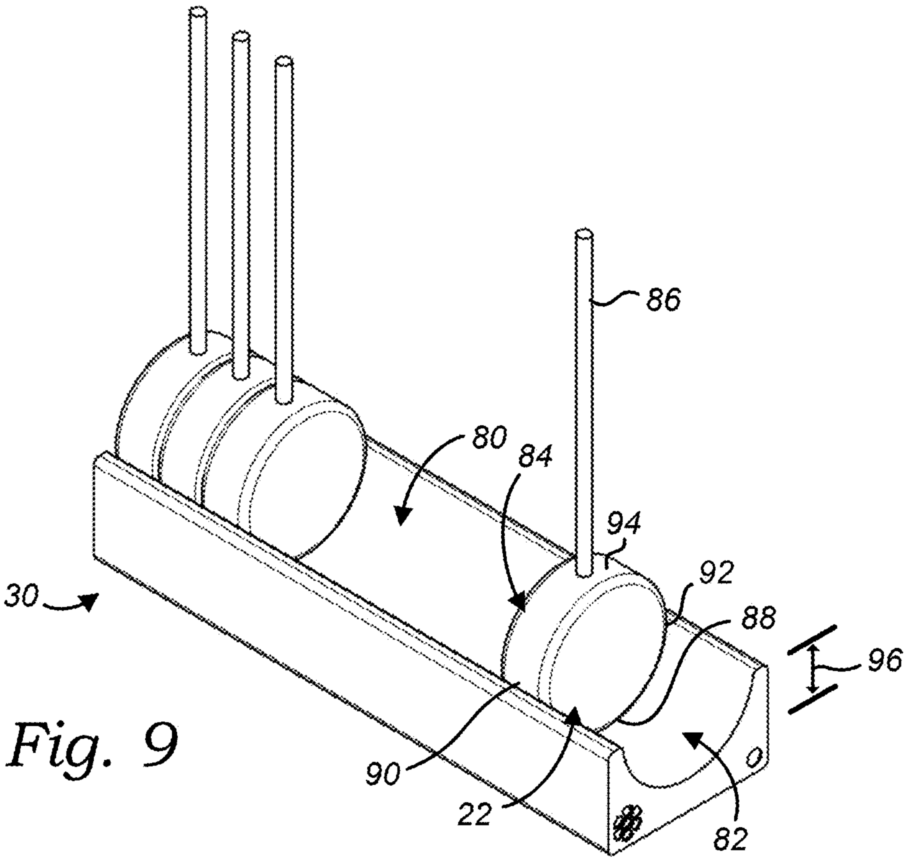

In at least one embodiment, as best illustrated in FIG. 4, the tray 30 provides a tray body 76, with at least one outer surface 78 of the tray body 76 defining an at least one elongate tray groove 80 extending along at least a portion of a length of the tray body 76. In at least one embodiment, the at least one tray groove 80 extends along the entire length of the tray body 76. In at least one embodiment, the at least one tray groove 80 has a groove shape 82 that substantially matches at least a portion of the cutout shape 46 of the cutter sidewall 34 in cross-section, thereby also substantially matching at least a portion of the cutout shape 46 of the food item 22. In at least one embodiment, the groove shape 82 of the at least one tray groove 80 substantially matches and conforms to an upper perimeter portion of the cutout shape 46 of the cutter sidewall 34 in cross-section, thereby also substantially matching an upper sidewall 88, along with at least a portion of a left sidewall 90 and an opposing right sidewall 92, of a food item sidewall 84 of the food item 22, as best illustrated in FIG. 9. Thus, the at least one food item 22 is able to be positioned within the at least one tray groove 80 in a substantially vertical/upright orientation, with the upper sidewall 88, along with at least a portion of the left sidewall 90 and right sidewall 92, of the at least one food item 22 positioned in contact with the at least one tray groove 80, such that a lower sidewall 94 of the food item sidewall 84 of the at least one food item 22 remains substantially uncontacted and unobstructed by the at least one tray groove 80. With the food items 22 so positioned within the at least one tray groove 80, the user is able to perform subsequent preparation steps on the food items 22, such as decorating the food items 22 or—where the food items 22 are cake pops, for example—inserting a stick 86 substantially perpendicularly into the lower sidewall 94 of the food item sidewall 84 of each food item 22 without worry of deforming the food item 22. In that regard, it should be noted that the respective locations of each of the upper sidewall 88, left sidewall 90, right sidewall 92 and lower sidewall 94 of the at least one food item 22 is based on and relative to the portion of the food item sidewall 84 in which the stick 86 is to be inserted (i.e., the portion of the food item sidewall 84 in which the stick 86 is to be inserted is the lower sidewall 94 of the at least one food item 22). In at least one embodiment, with continued reference to FIG. 9, the at least one tray groove 80 has a groove depth 96 that is sized for allowing the at least one tray groove 80 to contact and support therewithin the upper sidewall 88, along with at least a portion of the left sidewall 90 and right sidewall 92, of the at least one food item 22, while leaving the lower sidewall 94 of the at least one food item 22 substantially uncontacted and unobstructed. In at least one such embodiment, the at least one tray groove 80 has a groove depth 96 that is less than or equal to one-half of a food item height 98 (FIG. 8) of the at least one food item 22. In at least one alternate embodiment, the at least one tray groove 80 may have a groove depth 96 that is greater than one-half of the food item height 98 of the at least one food item 22.

Accordingly, during use of the apparatus 20 to form one or more cake pops (i.e., where the at least one food item 22 is a cake pop) in at least one embodiment, the user may first position the volume of food material 24 (i.e., cake pop dough) on a substantially flat surface, and roll the volume of food material 24 to be substantially flat until the volume of food material 24 has a desired food item thickness 100 (such as about 0.5 inches—2 inches, for example). The user then grasps the apparatus 20 with a single hand, such that a middle finger and a thumb of the user's hand are in contact with the handle portion 42 of the at least one cutter body 32. With the middle finger and thumb of the user's hand still in contact with the handle portion 42 of the at least one cutter body 32, the user moves the at least one ejector body 48 into the forward position relative to the corresponding at least one cutter body 32 using an index finger of the user's hand. With the middle finger and thumb of the user's hand still in contact with the handle portion 42 of the at least one cutter body 32, the user evenly presses the cutting edge 40 of the at least one cutter body 32 into and through the volume of food material 24 until the cutting edge 40 of the at least one cutter body 32 comes into contact with the surface on which the volume of food material 24 is positioned, forming within the at least one cutter body 32 the at least one food item 22 having the cutout shape 46 while simultaneously contacting the ejector surface 58 and moving the at least one ejector body 48 into the retracted position. With the middle finger and thumb of the user's hand still in contact with the handle portion 42 of the at least one cutter body 32, the user lifts the cutter body 32 away from the volume of food material 24. With the middle finger and thumb of the user's hand still in contact with the handle portion 42 of the at least one cutter body 32, the user moves the at least one cutter body 32 overtop of the at least one elongate tray groove 80 of the tray 30, and orients the least one cutter body 32 so that the ejector surface 58 of the at least one ejector body 48 is oriented substantially transverse to the tray groove 80 with the lower sidewall 94 of the at least one food item 22 facing substantially away from the tray groove 80. With the middle finger and thumb of the user's hand still in contact with the handle portion 42 of the at least one cutter body 32, the user moves the at least one ejector body 48 into the forward position relative to the corresponding at least one cutter body 32 using the index finger of the user's hand, causing the ejector surface 58 to eject the at least one food item 22 from the first end 36 of the at least one cutter body 32 and into the tray groove 80 in a substantially vertical orientation, with the upper sidewall 88, along with at least a portion of the left sidewall 90 and right sidewall 92, of the at least one food item 22 positioned in contact with the tray groove 80, such that the lower sidewall 94 of the food item 22 remains substantially uncontacted and unobstructed by the tray groove 80. With the food item 22 so positioned within the tray groove 80, the user then inserts a stick 86 substantially perpendicularly into the lower sidewall 94 of the food item 22. These steps are then repeated for each additional food item 22 that the user desires to form from the volume of food material 24. In at least one alternate embodiment, rather than grasping and operating the apparatus 20 with a single hand, the user may instead grasp the apparatus 20 with two hands, such that the handle portion 42 of the at least one cutter body 32 is positioned between the thumb and index finger of each hand, with the ejector body 48 being moved relative to the corresponding at least one cutter body 32 using one or both of the user's thumbs. It is also worth noting that because the groove shape 82 of the at least one tray groove 80 substantially matches and conforms to the upper perimeter portion of the cutout shape 46 of the cutter sidewall 34 in cross-section (thereby also substantially matching the upper sidewall 88, along with at least a portion of a left sidewall 90 and an opposing right sidewall 92, of the at least one food item 22), in the event the at least one food item 22 should be accidentally squished under the pressure of the user inserting the stick 86 into the lower sidewall 94 of the at least one food item 22, the groove shape 82 assists in maintaining the cutout shape 46 of the at least one food item 22, thereby preventing any substantial deformation in the cutout shape 46 of the at least one food item 22.

Figure 14:
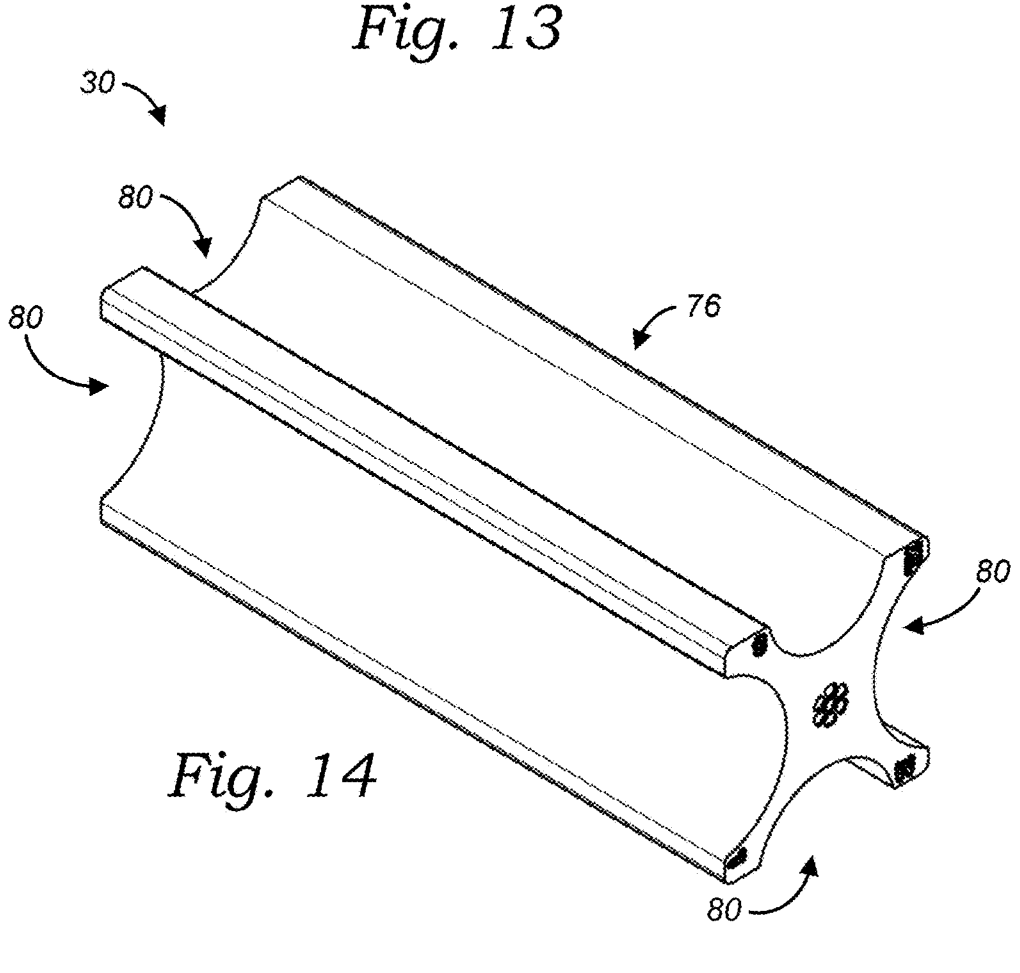
FIG. 14 is a perspective view of a further exemplary tray of the apparatus, in accordance with at least one embodiment.

In at least one further embodiment, as illustrated in FIG. 14, the tray body 76 may provide two or more tray grooves 80 positioned on the same outer surface 78 or different outer surfaces 78 of the tray body 76. In at least one such further embodiment, each of the tray grooves 80 has a different groove shape 82 and/or size for accommodating food items 22 having a variety of cutout shapes 46 and/or sizes. Thus, in further embodiments, the tray 30 and corresponding at least one tray groove 80 may each take on any other sizes, shapes, dimensions and/or configurations, now known or later developed—dependent at least in part on the context in which the apparatus 20 is to be used—so long as the apparatus 20 is capable of substantially carrying out the functionality described herein.

In at least one embodiment, one or more of the cutter 26, ejector 28 and tray 30 is 3D printed with polylactic acid ("PLA") or polyethylene terephthalate glycol ("PETG") plastic filament using a fused deposition modeling ("FDM") printer. However, in further embodiments, any other suitable materials of construction and/or methods of manufacture for one or more of the cutter 26, ejector 28 and tray 30, now known or later developed, may be substituted. In at least one embodiment, the cutter 26 and ejector 28 each has a length of about 40 millimeters to 45 millimeters with varying widths that are comfortable to operate by hand. In at least one embodiment, the cutter 26 and ejector 28 each has a height that is sufficient for accommodating a wide range of food material 24 thicknesses Additionally, in at least one embodiment, the hollow cutter body 32 may have varying internal dimensions, dependent at least in part on the cutout shape 46. In at least one embodiment, the cutter body 32 may have an internal surface are of about 800 square millimeters, about 1,100 square millimeters, about 1,550 square millimeters, or about 2,020 square millimeters. The dimensions of the cutter body 32 can also be matched with specific thickness of the volume of food material 24 in order to produce a food item 22 of a specific weight for portioning. In at least one embodiment, the tray 30 has a length of about 180 millimeters but could be longer or shorter, dependent at least in part on the context in which the apparatus 20 is to be used. Thus, in further embodiments, the cutter 26, ejector 28 and tray 30 may each take on any other sizes, shapes, dimensions, and/or configurations now known or later developed—dependent at least in part on the context in which the apparatus 20 is to be used—so long as the apparatus 20 is capable of substantially carrying out the functionality described herein.

Aspects of the present specification may also be described as the following embodiments:

1. A food item formation apparatus configured for producing a plurality of uniformly shaped and sized food items from a relatively larger volume of food material, the apparatus comprising: a cutter providing an at least one substantially tubular cutter body, each of the at least one cutter body comprising: a cutter sidewall that extends substantially about a perimeter of said cutter body and defines an open first end and an opposing open second end of said cutter body, the first end and second end being in fluid communication with one another; the cutter sidewall defining a hollow cutout shape of said cutter body in cross-section which extends from the first end of said cutter body to the second end of said cutter body; and the first end of said cutter body providing a cutting edge configured for cutting through the volume of food material; and an ejector providing an at least one elongate ejector body, each of the at least one ejector body comprising: an ejector sidewall that extends substantially about a perimeter of said ejector body and terminates at a first end and an opposing second end of said ejector body; the ejector sidewall defining an ejector shape of said ejector body in cross-section which extends from the first end of said ejector body to the second end of said ejector, the ejector shape being substantially the same as the cutout shape of the corresponding at least one cutter body, thereby allowing the first end of said ejector body to be slidably inserted into the second end of the corresponding at least one cutter body; and the first end of said ejector body providing an ejector surface oriented substantially transverse to the ejector sidewall; whereby, during use of the apparatus, with the first end of the at least one ejector body slidably positioned within the corresponding at least one cutter body, the cutting edge of the first end of the at least one cutter body may be pressed into the volume of food material, forming the at least one food item having the cutout shape, and the second end of the at least one ejector body may be subsequently pushed, causing the ejector surface to eject the food item from the first end of the cutter body.

2. The food item formation apparatus according to embodiment 1, wherein the cutter sidewall extends continuously about the perimeter of said cutter body.

3. The food item formation apparatus according to embodiments 1-2, wherein the cutter sidewall extends non-continuously about the perimeter of said cutter body.

4. The food item formation apparatus according to embodiments 1-3, wherein each of the first end and second end has the same cutout shape in cross-section as the cutter sidewall.

5. The food item formation apparatus according to embodiments 1-4, wherein the ejector sidewall has an outer diameter that is relatively smaller than an inner diameter of the cutter sidewall.

6. The food item formation apparatus according to embodiments 1-5, wherein the ejector surface has the same ejector shape as the ejector sidewall in cross-section.

7. The food item formation apparatus according to embodiments 1-6, wherein the at least one ejector body provides a beveled transition surface between the ejector sidewall and the ejector surface.

8. The food item formation apparatus according to embodiments 1-7, wherein the second end of the at least one cutter body provides a handle portion configured for allowing the cutter to be manually operated.

9. The food item formation apparatus according to embodiments 1-8, wherein the handle portion is configured for leaving the open second end of said cutter body substantially unobstructed.

10. The food item formation apparatus according to embodiments 1-9, wherein the handle portion provides an at least one handle tab extending substantially perpendicularly from an outer surface of the cutter sidewall.

11. The food item formation apparatus according to embodiments 1-10, wherein the cutting edge is beveled.

12. The food item formation apparatus according to embodiments 1-11, wherein the second end of the at least one ejector body provides an ejector base oriented substantially transverse to the ejector sidewall and configured for coming into abutting contact with the second end of the cutter body when the first end of said ejector body is slidably inserted a distance into the second end of the cutter body.

13. The food item formation apparatus according to embodiments 1-12, wherein the ejector base has a base diameter that is relatively larger than an inner diameter of the cutter sidewall.

14. The food item formation apparatus according to embodiments 1-13, wherein the ejector base has a shape that substantially matches the ejector shape of the ejector sidewall in cross-section.

15. The food item formation apparatus according to embodiments 1-14, wherein the ejector surface of the at least one ejector body provides an embossing member configured for forming a surface design on an upper surface of the food item.

16. The food item formation apparatus according to embodiments 1-15, wherein the embossing surface has the same shape as the ejector shape of said ejector surface.

17. The food item formation apparatus according to embodiments 1-16, wherein the embossing member is integral with said ejector surface.

18. The food item formation apparatus according to embodiments 1-17, wherein the embossing member is removably engageable with said ejector surface.

19. The food item formation apparatus according to embodiments 1-18, wherein a first threaded member provided by the embossing member is threadably engageable with a corresponding second threaded member provided by said ejector surface.

20. The food item formation apparatus according to embodiments 1-19, wherein: the cutter provides a plurality of cutter bodies positioned in a side-by-side arrangement; and the ejector provides a corresponding plurality of ejector bodies positioned in a corresponding side-by-side arrangement.

21. The food item formation apparatus according to embodiments 1-20, further comprising: a tray providing a tray body with at least one outer surface of the tray body defining an at least one elongate tray groove extending along at least a portion of a length of the tray body; and the at least one tray groove having a groove shape that substantially matches at least a portion of the cutout shape of the cutter sidewall in cross-section, for supporting the food items therewithin in a substantially vertical orientation.

22. The food item formation apparatus according to embodiments 1-21, wherein the tray body provides two or more tray grooves positioned on the at least one outer surface of the tray body.

23. The food item formation apparatus according to embodiments 1-22, wherein the apparatus is configured for being used with a single hand by the user and performing the steps of: (a) positioning the volume of food material on a substantially flat surface; (b) rolling the volume of food material to be substantially flat until the volume of food material has a desired thickness; (c) grasping the apparatus with a single hand, such that a middle finger and a thumb of the user's hand are in contact with the handle portion of the at least one cutter body; (d) with the middle finger and thumb of the user's hand still in contact with the handle portion of the at least one cutter body, moving the at least one ejector body into the forward position relative to the corresponding at least one cutter body using an index finger of the user's hand; (e) with the middle finger and thumb of the user's hand still in contact with the handle portion of the at least one cutter body, evenly pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position; (f) with the middle finger and thumb of the user's hand still in contact with the handle portion of the at least one cutter body, lifting the cutter body away from the volume of food material; (g) with the middle finger and thumb of the user's hand still in contact with the handle portion of the at least one cutter body, moving the at least one cutter body overtop of a desired surface; (h) with the middle finger and thumb of the user's hand still in contact with the handle portion of the at least one cutter body, moving the at least one ejector body into the forward position relative to the corresponding at least one cutter body using the index finger of the user's hand, causing the ejector surface to eject the food item from the first opening of the at least one cutter body and onto the desired surface; and (i) repeating steps (e)-(h) as desired, or until the volume of food material has been completely used, whichever comes first.

24. A food item formation apparatus configured for producing a plurality of uniformly shaped and sized food items from a relatively larger volume of food material, the apparatus comprising: a cutter providing an at least one substantially tubular cutter body, each of the at least one cutter body comprising: a cutter sidewall that extends substantially about a perimeter of said cutter body and defines an open first end and an opposing open second end of said cutter body, the first end and second end being in fluid communication with one another; the cutter sidewall defining a hollow cutout shape of said cutter body in cross-section which extends from the first end of said cutter body to the second end of said cutter body; and the first end of said cutter body providing a cutting edge configured for cutting through the volume of food material; an ejector providing an at least one elongate ejector body, each of the at least one ejector body comprising: an ejector sidewall that extends substantially about a perimeter of said ejector body and terminates at a first end and an opposing second end of said ejector body; the ejector sidewall defining an ejector shape of said ejector body in cross-section which extends from the first end of said ejector body to the second end of said ejector, the ejector shape being substantially the same as the cutout shape of the corresponding at least one cutter body, thereby allowing the first end of said ejector body to be slidably inserted into the second end of the corresponding at least one cutter body; and the first end of said ejector body providing an ejector surface oriented substantially transverse to the ejector sidewall; and a tray providing a tray body comprising: an at least one elongate tray groove positioned on at least one outer surface of the tray body and extending along at least a portion of a length of the tray body; and the at least one tray groove having a groove shape that substantially matches at least a portion of the cutout shape of the cutter sidewall in cross-section, for supporting the food items therewithin in a substantially vertical orientation; whereby, during use of the apparatus, with the first end of the at least one ejector body slidably positioned within the corresponding at least one cutter body, the cutting edge of the first end of the at least one cutter body may be pressed into the volume of food material, forming the at least one food item having the cutout shape, and the second end of the at least one ejector body may be subsequently pushed, causing the ejector surface to eject the food item from the first end of the cutter body.

25. The food item formation apparatus according to embodiment 24, wherein the apparatus is configured for being used with a single hand by the user and performing the steps of: (a) positioning the volume of food material on a substantially flat surface; (b) rolling the volume of food material to be substantially flat until the volume of food material has a desired thickness; (c) grasping the apparatus with a single hand, such that a middle finger and a thumb of the user's hand are in contact with the handle portion of the at least one cutter body; (d) with the middle finger and thumb of the user's hand still in contact with the handle portion of the at least one cutter body, moving the at least one ejector body into the forward position relative to the corresponding at least one cutter body using an index finger of the user's hand; (e) with the middle finger and thumb of the user's hand still in contact with the handle portion of the at least one cutter body, evenly pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position; (f) with the middle finger and thumb of the user's hand still in contact with the handle portion of the at least one cutter body, lifting the cutter body away from the volume of food material; (g) with the middle finger and thumb of the user's hand still in contact with the handle portion of the at least one cutter body, moving the at least one cutter body overtop of the at least one elongate tray groove of the tray, and orienting the least one cutter body so that the ejector surface of the at least one ejector body is oriented substantially transverse to the tray groove; (h) with the middle finger and thumb of the user's hand still in contact with the handle portion of the at least one cutter body, moving the at least one ejector body into the forward position relative to the corresponding at least one cutter body using the index finger of the user's hand, causing the ejector surface to eject the food item from the first opening of the at least one cutter body and into the tray groove in a substantially vertical orientation; (i) inserting a stick substantially perpendicularly into a food item sidewall the food item; and (j) repeating steps (e)-(i) as desired, or until the volume of food material has been completely used, whichever comes first.

26. A food item formation apparatus configured for producing a plurality of uniformly shaped and sized food items from a relatively larger volume of food material, the apparatus comprising: a cutter providing an at least one substantially tubular cutter body, each of the at least one cutter body comprising: a cutter sidewall that extends substantially about a perimeter of said cutter body and defines an open first end and an opposing open second end of said cutter body, the first end and second end being in fluid communication with one another; the cutter sidewall defining a hollow cutout shape of said cutter body in cross-section which extends from the first end of said cutter body to the second end of said cutter body; and the first end of said cutter body providing a cutting edge configured for cutting through the volume of food material; and an ejector providing an at least one elongate ejector body, each of the at least one ejector body comprising: an ejector sidewall that extends substantially about a perimeter of said ejector body and terminates at a first end and an opposing second end of said ejector body; the ejector sidewall defining an ejector shape of said ejector body in cross-section which extends from the first end of said ejector body to the second end of said ejector, the ejector shape being substantially the same as the cutout shape of the corresponding at least one cutter body, thereby allowing the first end of said ejector body to be slidably inserted into the second end of the corresponding at least one cutter body; the first end of said ejector body providing an ejector surface oriented substantially transverse to the ejector sidewall; and the ejector surface providing an embossing member configured for forming a surface design on an upper surface of the food item; whereby, during use of the apparatus, with the first end of the at least one ejector body slidably positioned within the corresponding at least one cutter body, the cutting edge of the first end of the at least one cutter body may be pressed into the volume of food material, forming the at least one food item having the cutout shape, and the second end of the at least one ejector body may be subsequently pushed, causing the ejector surface to eject the food item from the first end of the cutter body, with the upper surface of the food item having the surface design thereon.

27. The food item formation apparatus according to embodiment 26, wherein the apparatus is configured for being used with a single hand by the user and performing the steps of: (a) positioning the volume of food material on a substantially flat surface; (b) rolling the volume of food material to be substantially flat until the volume of food material has a desired thickness; (c) grasping the apparatus with a single hand, such that a middle finger and a thumb of the user's hand are in contact with the handle portion of the at least one cutter body; (d) with the middle finger and thumb of the user's hand still in contact with the handle portion of the at least one cutter body, moving the at least one ejector body into the forward position relative to the corresponding at least one cutter body using an index finger of the user's hand; (e) with the middle finger and thumb of the user's hand still in contact with the handle portion of the at least one cutter body, evenly pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position; (f) with the middle finger and thumb of the user's hand still in contact with the handle portion of the at least one cutter body, lifting the cutter body away from the volume of food material; (g) with the middle finger and thumb of the user's hand still in contact with the handle portion of the at least one cutter body, moving the at least one cutter body overtop of a desired surface; (h) with the middle finger and thumb of the user's hand still in contact with the handle portion of the at least one cutter body, moving the at least one ejector body into the forward position relative to the corresponding at least one cutter body using the index finger of the user's hand, causing the ejector surface to eject the food item from the first opening of the at least one cutter body and onto the desired surface; and (i) repeating steps (e)-(h) as desired, or until the volume of food material has been completely used, whichever comes first.

28. A food item formation apparatus configured for producing a plurality of uniformly shaped and sized food items from a volume of food material, the apparatus comprising: a cutter providing an at least one cutter body, each of the at least one cutter body comprising: a cutter sidewall extending substantially about a perimeter of said cutter body and terminating longitudinally at each of a first end and an opposing second end of said cutter body; the cutter sidewall defining a hollow cutout shape of said cutter body in cross-section, the cutout shape extending from the first end of said cutter body to the second end of said cutter body; the cutter sidewall further defining a first opening at the first end of said cutter body, and a second opening at the second end of said cutter body in fluid communication with the first opening; a perimeter of the first opening providing a cutting edge configured for cutting through the volume of food material and forming within said cutter body the at least one food item having the cutout shape, the cutter sidewall configured for frictionally retaining the at least one food item within the at least one cutter body; an ejector providing an at least one elongate ejector body slidably positioned within the at least one cutter body, each of the at least one ejector body comprising: an ejector sidewall extending substantially about a perimeter of said ejector body and terminating longitudinally at each of a first end and an opposing second end of said ejector body; the ejector sidewall defining an ejector shape of said ejector body in cross-section, the ejector shape extending from the first end of said ejector body to the second end of said ejector body, the ejector shape being the same as the cutout shape of the corresponding at least one cutter body; the first end of said ejector body providing an ejector surface oriented substantially transverse to the ejector sidewall and having the ejector shape; and said ejector body configured for moving between one of a retracted position—wherein the ejector surface is longitudinally spaced a distance apart from the first opening of the corresponding at least one cutter body—and a forward position—wherein the ejector surface is longitudinally moved toward the first opening of the corresponding at least one cutter body until the ejector surface lies in substantially the same plane as the first opening of the corresponding at least one cutter body; and a tray providing a tray body comprising: an at least one elongate tray groove positioned on at least one outer surface of the tray body and extending along at least a portion of a length of the tray body; and the at least one tray groove having a groove shape that substantially matches an upper perimeter portion of the cutout shape of the cutter sidewall in cross-section which, in turn, substantially matches an upper sidewall, along with at least a portion of a left sidewall and an opposing right sidewall, of the at least one food item, such that the at least one tray groove supports the at least one food item therewithin in a substantially vertical orientation, with a lower sidewall of the at least one food item remaining uncontacted and unobstructed by the at least one tray groove; whereby, during use of the apparatus, with the at least one ejector body in the forward position relative to the corresponding at least one cutter body and the volume of food material positioned on a substantially flat surface, the apparatus is configured for allowing a user to press the cutting edge of the at least one cutter body into and through the volume of food material, forming within the at least one cutter body the at least one food item having the cutout shape while simultaneously contacting the ejector surface and moving the at least one ejector body into the retracted position, lift the at least one cutter body away from the volume of food material, move the at least one cutter body overtop of the at least one tray groove of the tray, orient the least one cutter body so that the ejector surface of the at least one ejector body is oriented substantially transverse to the at least one tray groove with the lower sidewall of the at least one food item facing substantially away from the at least one tray groove, and subsequently move the at least one ejector body back into the forward position, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove, after which the user may insert a stick substantially perpendicularly into the lower sidewall of the at least one food item.

29. The food item formation apparatus according to embodiment 28, wherein the first opening and second opening of the at least one cutter body are each oriented transverse to the cutter sidewall and have the cutout shape.

30. The food item formation apparatus according to embodiments 28-29, wherein the second end of the at least one ejector body provides an ejector base oriented substantially transverse to the ejector sidewall and radially extending outwardly, substantially about the perimeter of said ejector body for coming into abutting contact with the second end of the corresponding at least one cutter body when the first end of said ejector body is slidably moved a distance through said cutter body.

31. The food item formation apparatus according to embodiments 28-30, wherein the ejector base lies in the same plane as the second end of said ejector body.

32. The food item formation apparatus according to embodiments 28-31, wherein the ejector base has a base diameter that is larger than an inner diameter of the cutter sidewall.

33. The food item formation apparatus according to embodiments 28-32, wherein the ejector base has a shape that substantially matches the ejector shape of the ejector sidewall in cross-section.

34. The food item formation apparatus according to embodiments 28-33, wherein the at least one ejector body provides a beveled transition surface between the ejector sidewall and the ejector surface.

35. The food item formation apparatus according to embodiments 28-34, wherein the second end of the at least one cutter body provides a handle portion oriented substantially transverse to the cutter sidewall and radially extending outwardly, substantially about a perimeter of the second opening, the handle portion lying in the same plane as the second opening and positioned external to the second opening thereby leaving the second opening unobstructed.

36. The food item formation apparatus according to embodiments 28-35, wherein the handle portion provides an at least one handle tab extending substantially perpendicularly from an outer surface of the cutter sidewall.

37. The food item formation apparatus according to embodiments 28-36, wherein the apparatus is configured for being used with a single hand by the user and performing the steps of: (a) positioning the volume of food material on a substantially flat surface; (b) rolling the volume of food material to be substantially flat until the volume of food material has a desired thickness; (c) grasping the apparatus with a single hand, such that a middle finger and a thumb of the user's hand are in contact with the handle portion of the at least one cutter body; (d) with the middle finger and thumb of the user's hand still in contact with the handle portion of the at least one cutter body, moving the at least one ejector body into the forward position relative to the corresponding at least one cutter body using an index finger of the user's hand; (e) with the middle finger and thumb of the user's hand still in contact with the handle portion of the at least one cutter body, evenly pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position; (f) with the middle finger and thumb of the user's hand still in contact with the handle portion of the at least one cutter body, lifting the cutter body away from the volume of food material; (g) with the middle finger and thumb of the user's hand still in contact with the handle portion of the at least one cutter body, moving the at least one cutter body overtop of the at least one elongate tray groove of the tray, and orienting the least one cutter body so that the ejector surface of the at least one ejector body is oriented substantially transverse to the at least one tray groove with the lower sidewall of the at least one food item facing substantially away from the at least one tray groove; (h) with the middle finger and thumb of the user's hand still in contact with the handle portion of the at least one cutter body, moving the at least one ejector body into the forward position relative to the corresponding at least one cutter body using the index finger of the user's hand, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove; (i) inserting a stick substantially perpendicularly into the lower sidewall of the at least one food item; and (j) repeating steps (e)-(i) as desired, or until the volume of food material has been completely used, whichever comes first.

38. The food item formation apparatus according to embodiments 28-37, wherein the cutting edge of the at least one cutter body is beveled.

39. The food item formation apparatus according to embodiments 28-38, wherein the ejector surface of the at least one ejector body provides an embossing member configured for forming a surface design on an upper surface of the food item.

40. The food item formation apparatus according to embodiments 28-39, wherein the embossing member has the same shape as the ejector shape of said ejector surface.

41. The food item formation apparatus according to embodiments 28-40, wherein the embossing member is integral with said ejector surface.

42. The food item formation apparatus according to embodiments 28-41, wherein the embossing member is removably engageable with said ejector surface.

43. The food item formation apparatus according to embodiments 28-42, wherein the at least one ejector body has a height such that, when said ejector body is in the forward position, the ejector surface lies in the same plane as the cutting edge of the corresponding at least one cutter body.

44. The food item formation apparatus according to embodiments 28-43, wherein: the cutter provides a plurality of cutter bodies positioned in a side-by-side arrangement; and the ejector provides a corresponding plurality of ejector bodies positioned in a corresponding side-by-side arrangement.

45. The food item formation apparatus according to embodiments 28-44, wherein the upper perimeter portion of the cutout shape is substantially non-semicircular in cross-section, such that the upper sidewall of the at least one food item, along with at least a portion of the left sidewall and right sidewall of the at least one food item, is likewise substantially non-semicircular in cross-section.

46. The food item formation apparatus according to embodiments 28-45, wherein the tray body provides two or more tray grooves positioned on the at least one outer surface of the tray body.

47. The food item formation apparatus according to embodiments 28-46, wherein the at least one tray groove has a groove depth that is sized for allowing the at least one tray groove to contact and support therewithin the upper sidewall, along with at least a portion of the left sidewall and right sidewall, of the at least one food item, while leaving the lower sidewall of the at least one food item uncontacted and unobstructed.

48. The food item formation apparatus according to embodiments 28-47, wherein the at least one tray groove has a groove depth that is less than or equal to one-half of a food item height of the at least one food item.

49. A food item formation apparatus configured for producing a plurality of uniformly shaped and sized food items from a volume of food material, the apparatus comprising: a cutter providing an at least one cutter body, each of the at least one cutter body comprising: a cutter sidewall extending substantially about a perimeter of said cutter body and terminating longitudinally at each of a first end and an opposing second end of said cutter body; the cutter sidewall defining a hollow cutout shape of said cutter body in cross-section, the cutout shape extending from the first end of said cutter body to the second end of said cutter body; an upper perimeter portion of the cutout shape being substantially non-semicircular in cross-section; the cutter sidewall further defining a first opening at the first end of said cutter body, and a second opening at the second end of said cutter body in fluid communication with the first opening; a perimeter of the first opening providing a cutting edge configured for cutting through the volume of food material and forming within said cutter body the at least one food item having the cutout shape, with an upper sidewall of the at least one food item, along with at least a portion of a left sidewall and an opposing right sidewall of the at least one food item, being substantially non-semicircular in cross-section, the cutter sidewall configured for frictionally retaining the at least one food item within the at least one cutter body; an ejector providing an at least one elongate ejector body slidably positioned within the at least one cutter body, each of the at least one ejector body comprising: an ejector sidewall extending substantially about a perimeter of said ejector body and terminating longitudinally at each of a first end and an opposing second end of said ejector body; the ejector sidewall defining an ejector shape of said ejector body in cross-section, the ejector shape extending from the first end of said ejector body to the second end of said ejector body, the ejector shape being the same as the cutout shape of the corresponding at least one cutter body; the first end of said ejector body providing an ejector surface oriented substantially transverse to the ejector sidewall and having the ejector shape; and said ejector body configured for moving between one of a retracted position—wherein the ejector surface is longitudinally spaced a distance apart from the first opening of the corresponding at least one cutter body—and a forward position—wherein the ejector surface is longitudinally moved toward the first opening of the corresponding at least one cutter body until the ejector surface lies in substantially the same plane as the first opening of the corresponding at least one cutter body; and a tray providing a tray body comprising: an at least one elongate tray groove positioned on at least one outer surface of the tray body and extending along at least a portion of a length of the tray body; and the at least one tray groove having a groove shape that substantially matches the upper perimeter portion of the cutout shape of the cutter sidewall in cross-section which, in turn, substantially matches the upper sidewall, along with at least a portion of the left sidewall and right sidewall, of the at least one food item, such that the at least one tray groove supports the at least one food item therewithin in a substantially vertical orientation, with a lower sidewall of the at least one food item remaining uncontacted and unobstructed by the at least one tray groove; whereby, during use of the apparatus, with the at least one ejector body in the forward position relative to the corresponding at least one cutter body and the volume of food material positioned on a substantially flat surface, the apparatus is configured for allowing a user to press the cutting edge of the at least one cutter body into and through the volume of food material, forming within the at least one cutter body the at least one food item having the cutout shape while simultaneously contacting the ejector surface and moving the at least one ejector body into the retracted position, lift the at least one cutter body away from the volume of food material, move the at least one cutter body overtop of the at least one tray groove of the tray, orient the least one cutter body so that the ejector surface of the at least one ejector body is oriented substantially transverse to the at least one tray groove with the lower sidewall of the at least one food item facing substantially away from the at least one tray groove, and subsequently move the at least one ejector body back into the forward position, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove, after which the user may insert a stick substantially perpendicularly into the lower sidewall of the at least one food item.

50. A method for producing a plurality of uniformly shaped and sized food items from a volume of food material using the food item formation apparatus according to embodiments 28-48, the method comprising the steps of: (a) positioning the volume of food material on a substantially flat surface; (b) rolling the volume of food material to be substantially flat until the volume of food material has a desired thickness; (c) manually moving the at least one ejector body into the forward position relative to the corresponding at least one cutter body; (d) manually pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position; (e) lifting the cutter body away from the volume of food material; (f) moving the at least one cutter body overtop of the at least one elongate tray groove of the tray, and orienting the least one cutter body so that the ejector surface of the at least one ejector body is oriented substantially transverse to the at least one tray groove with the lower sidewall of the at least one food item facing substantially away from the at least one tray groove; (g) manually moving the at least one ejector body into the forward position relative to the corresponding at least one cutter body, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove; (h) inserting a stick substantially perpendicularly into the lower sidewall of the at least one food item; and (j) repeating steps (d)-(h) as desired, or until the volume of food material has been completely used, whichever comes first.

In closing, regarding the exemplary embodiments of the present invention as shown and described herein, it will be appreciated that a cake pop formation apparatus and associated methods of use are disclosed and configured for producing uniformly shaped and sized cake pops in a relatively more efficient manner. Because the principles of the invention may be practiced in a number of configurations beyond those shown and described, it is to be understood that the invention is not in any way limited by the exemplary embodiments, but is generally directed to a cake pop formation apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A food item formation apparatus configured for producing a plurality of uniformly shaped and sized food items from a volume of food material, the apparatus comprising:

a cutter providing an at least one cutter body, each of the at least one cutter body consisting of:

a cutter sidewall extending substantially about a perimeter of said cutter body and terminating longitudinally at each of a first end and an opposing second end of said cutter body;

the cutter sidewall defining a hollow cutout shape of said cutter body in cross-section, the cutout shape extending from the first end of said cutter body to the second end of said cutter body such that the cutter sidewall has a uniform inner width between the first end and the second end;

the cutter sidewall further defining a first opening at the first end of said cutter body, and a second opening at the second end of said cutter body in fluid communication with the first opening, the first opening and second opening each oriented transverse to the cutter sidewall and having the cutout shape along with the same inner width as the cutter sidewall;

a perimeter of the first opening providing a cutting edge configured for cutting through the volume of food material and forming within said cutter body the at least one food item having the cutout shape, the cutter sidewall configured for frictionally retaining the at least one food item within the at least one cutter body; and the second end of said cutter body providing a handle portion oriented substantially transverse to the cutter sidewall and radially extending outwardly, substantially about a perimeter of the second opening, the handle portion lying in substantially the same plane as the second opening and positioned external to the second opening thereby leaving the second opening unobstructed;

an ejector providing an at least one elongate ejector body removably and slidably positioned within the second opening of the corresponding at least one cutter body, each of the at least one ejector body consisting of:

an ejector sidewall extending substantially about a perimeter of said ejector body and terminating longitudinally at each of a first end and an opposing second end of said ejector body;

the ejector sidewall defining an ejector shape of said ejector body in cross-section, the ejector shape extending from the first end of said ejector body to the second end of said ejector body, the ejector shape being the same as the cutout shape of the corresponding at least one cutter body;

the first end of said ejector body providing an ejector surface oriented substantially transverse to the ejector sidewall and having the ejector shape;

the second end of said ejector body providing an ejector base oriented substantially transverse to the ejector sidewall and radially extending outwardly, substantially about the perimeter of said ejector body for coming into abutting contact with the second opening of the corresponding at least one cutter body when the first end of said ejector body is slidably moved a distance through said cutter body, the ejector base lying in substantially the same plane as the second end of said ejector body;

said ejector body configured for moving between one of a retracted position—wherein the ejector base is longitudinally spaced a distance apart from the second opening of the corresponding at least one cutter body—and a forward position—wherein the ejector surface is longitudinally moved toward the first opening of the corresponding at least one cutter body until the ejector base comes into abutting contact with the second opening of the corresponding at least one cutter body;

said ejector body having a uniform outer width from the first end of said ejector body to the second end of said ejector body that is substantially equal to the inner width of each of the first opening, cutter sidewall and second opening of the corresponding at least one cutter body; and the first end of said ejector body is capable of freely passing through the second opening of the corresponding at least one cutter body during use of the apparatus;

a tray providing a tray body consisting of:

an at least one elongate tray groove positioned on at least one outer surface of the tray body and extending along at least a portion of a length of the tray body; and the at least one tray groove having a groove shape that matches an upper perimeter portion of the cutout shape of the cutter sidewall in cross-section which, in turn, matches an entire upper sidewall, along with at least a portion of a left sidewall and an opposing right sidewall, of the at least one food item, such that the at least one tray groove creates a continuous contact between the tray groove and the entire upper sidewall, along with at least a portion of the left sidewall and right sidewall, and supports the at least one food item therewithin in a substantially vertical orientation, with a lower sidewall of the at least one food item remaining uncontacted and unobstructed by the at least one tray groove;

whereby, during use of the apparatus, with the at least one ejector body in the forward position relative to the corresponding at least one cutter body and the volume of food material positioned on a substantially flat surface, the apparatus is configured for allowing a user to press the cutting edge of the at least one cutter body into and through the volume of food material, forming within the at least one cutter body the at least one food item having the cutout shape while simultaneously contacting the ejector surface and moving the at least one ejector body into the retracted position, lift the at least one cutter body away from the volume of food material, move the at least one cutter body overtop of the at least one tray groove of the tray, orient the least one cutter body so that the ejector surface of the at least one ejector body is oriented substantially transverse to the at least one tray groove with the lower sidewall of the at least one food item facing substantially away from the at least one tray groove, and subsequently move the at least one ejector body back into the forward position, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove, after which the user may insert a stick substantially perpendicularly into the lower sidewall of the at least one food item.

2. The food item formation apparatus of claim 1, wherein the ejector base lies in the same plane as the second end of said ejector body.

3. The food item formation apparatus of claim 1, wherein the at least one ejector body provides a beveled transition surface between the ejector sidewall and the ejector surface.

4. The food item formation apparatus of claim 1, wherein the handle portion lies in the same plane as the second opening of the cutter body.

5. The food item formation apparatus of claim 4, wherein the handle portion provides an at least one handle tab extending substantially perpendicularly from an outer surface of the cutter sidewall.

6. The food item formation apparatus of claim 4, wherein the apparatus is configured for being used with a single hand by the user and performing the steps of:

(a) positioning the volume of food material on a substantially flat surface;

(b) rolling the volume of food material to be substantially flat until the volume of food material has a desired thickness;

(c) grasping the apparatus with a single hand, such that a middle finger and a thumb of the user's hand are in contact with the handle portion of the at least one cutter body;

(d) with the middle finger and thumb of the user's hand still in contact with the handle portion of the at least one cutter body, moving the at least one ejector body into the forward position relative to the corresponding at least one cutter body using an index finger of the user's hand;

(e) with the middle finger and thumb of the user's hand still in contact with the handle portion of the at least one cutter body, evenly pressing the cutting edge of the at least one cutter body into and through the volume of food material until the cutting edge of the at least one cutter body comes into contact with the surface on which the volume of food material is positioned, forming within the at least one cutter body the at least one food item having the cutout shape while simultaneously contacting the ejector surface and moving the at least one ejector body into the retracted position;

(f) with the middle finger and thumb of the user's hand still in contact with the handle portion of the at least one cutter body, lifting the cutter body away from the volume of food material;

(g) with the middle finger and thumb of the user's hand still in contact with the handle portion of the at least one cutter body, moving the at least one cutter body overtop of the at least one elongate tray groove of the tray, and orienting the least one cutter body so that the ejector surface of the at least one ejector body is oriented substantially transverse to the at least one tray groove with the lower sidewall of the at least one food item facing substantially away from the at least one tray groove;

(h) with the middle finger and thumb of the user's hand still in contact with the handle portion of the at least one cutter body, moving the at least one ejector body into the forward position relative to the corresponding at least one cutter body using the index finger of the user's hand, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove;

(i) inserting a stick substantially perpendicularly into the lower sidewall of the at least one food item; and (j) repeating steps (e)-(i) as desired, or until the volume of food material has been completely used, whichever comes first.

7. The food item formation apparatus of claim 1, wherein the cutting edge of the at least one cutter body is beveled.

8. The food item formation apparatus of claim 1, wherein the ejector surface of the at least one ejector body provides an embossing member configured for forming a surface design on an upper surface of the food item.

9. The food item formation apparatus of claim 8, wherein the embossing member has the same shape as the ejector shape of said ejector surface.

10. The food item formation apparatus of claim 8, wherein the embossing member is removably engageable with said ejector surface.

11. The food item formation apparatus of claim 1, wherein the at least one ejector body has a height such that, when said ejector body is in the forward position, the ejector surface lies in substantially the same plane as the cutting edge of the corresponding at least one cutter body.

12. The food item formation apparatus of claim 1, wherein:

the cutter provides a plurality of cutter bodies positioned in a side-by-side arrangement; and the ejector provides a corresponding plurality of ejector bodies positioned in a corresponding side-by-side arrangement.

13. The food item formation apparatus of claim 1, wherein the upper perimeter portion of the cutout shape is substantially non-semicircular in cross-section, such that the upper sidewall of the at least one food item, along with at least a portion of the left sidewall and right sidewall of the at least one food item, is likewise substantially non-semicircular in cross-section.

14. The food item formation apparatus of claim 1, wherein the tray body provides two or more tray grooves positioned on the at least one outer surface of the tray body.

15. The food item formation apparatus of claim 1, wherein the at least one tray groove has a groove depth that is sized for allowing the at least one tray groove to contact and support therewithin the upper sidewall, along with at least a portion of the left sidewall and right sidewall, of the at least one food item, while leaving the lower sidewall of the at least one food item uncontacted and unobstructed.

16. The food item formation apparatus of claim 15, wherein the at least one tray groove has a groove depth that is less than or equal to one-half of a food item height of the at least one food item.

17. A food item formation apparatus configured for producing a plurality of uniformly shaped and sized food items from a volume of food material, the apparatus comprising:

a cutter providing an at least one cutter body, each of the at least one cutter body consisting of:

a cutter sidewall extending substantially about a perimeter of said cutter body and terminating longitudinally at each of a first end and an opposing second end of said cutter body;

the cutter sidewall defining a hollow cutout shape of said cutter body in cross-section, the cutout shape extending from the first end of said cutter body to the second end of said cutter body such that the cutter sidewall has a uniform inner width between the first end and the second end;

an upper perimeter portion of the cutout shape being substantially non-semicircular in cross-section;

the cutter sidewall further defining a first opening at the first end of said cutter body, and a second opening at the second end of said cutter body in fluid communication with the first opening, the first opening and second opening each oriented transverse to the cutter sidewall and having the cutout shape along with the same inner width as the cutter sidewall;

a perimeter of the first opening providing a cutting edge configured for cutting through the volume of food material and forming within said cutter body the at least one food item having the cutout shape, with an upper sidewall of the at least one food item, along with at least a portion of a left sidewall and an opposing right sidewall of the at least one food item, being substantially non-semicircular in cross-section, the cutter sidewall configured for frictionally retaining the at least one food item within the at least one cutter body; and the second end of said cutter body providing a handle portion oriented substantially transverse to the cutter sidewall and radially extending outwardly, substantially about a perimeter of the second opening, the handle portion lying in substantially the same plane as the second opening and positioned external to the second opening thereby leaving the second opening unobstructed;

an ejector providing an at least one elongate ejector body removably and slidably positioned within the second opening of the corresponding at least one cutter body, each of the at least one ejector body consisting of:

an ejector sidewall extending substantially about a perimeter of said ejector body and terminating longitudinally at each of a first end and an opposing second end of said ejector body;

the ejector sidewall defining an ejector shape of said ejector body in cross-section, the ejector shape extending from the first end of said ejector body to the second end of said ejector body, the ejector shape being the same as the cutout shape of the corresponding at least one cutter body;

the first end of said ejector body providing an ejector surface oriented substantially transverse to the ejector sidewall and having the ejector shape;

the second end of said ejector body providing an ejector base oriented substantially transverse to the ejector sidewall and radially extending outwardly, substantially about the perimeter of said ejector body for coming into abutting contact with the second opening of the corresponding at least one cutter body when the first end of said ejector body is slidably moved a distance through said cutter body, the ejector base lying in substantially the same plane as the second end of said ejector body;

said ejector body configured for moving between one of a retracted position—wherein the ejector base is longitudinally spaced a distance apart from the second opening of the corresponding at least one cutter body—and a forward position—wherein the ejector surface is longitudinally moved toward the first opening of the corresponding at least one cutter body until the ejector base comes into abutting contact with the second opening of the corresponding at least one cutter body;

said ejector body having a uniform outer width from the first end of said ejector body to the second end of said ejector body that is substantially equal to the inner width of each of the first opening, cutter sidewall and second opening of the corresponding at least one cutter body; and the first end of said ejector body is capable of freely passing through the second opening of the corresponding at least one cutter body during use of the apparatus;

a tray providing a tray body consisting of:

an at least one elongate tray groove positioned on at least one outer surface of the tray body and extending along at least a portion of a length of the tray body; and the at least one tray groove having a groove shape that matches the upper perimeter portion of the cutout shape of the cutter sidewall in cross-section which, in turn, matches the entire upper sidewall, along with at least a portion of the left sidewall and right sidewall, of the at least one food item, such that the at least one tray groove creates a continuous contact between the tray groove and the entire upper sidewall, along with at least a portion of the left sidewall and right sidewall, and supports the at least one food item therewithin in a substantially vertical orientation, with a lower sidewall of the at least one food item remaining uncontacted and unobstructed by the at least one tray groove;

whereby, during use of the apparatus, with the at least one ejector body in the forward position relative to the corresponding at least one cutter body and the volume of food material positioned on a substantially flat surface, the apparatus is configured for allowing a user to press the cutting edge of the at least one cutter body into and through the volume of food material, forming within the at least one cutter body the at least one food item having the cutout shape while simultaneously contacting the ejector surface and moving the at least one ejector body into the retracted position, lift the at least one cutter body away from the volume of food material, move the at least one cutter body overtop of the at least one tray groove of the tray, orient the least one cutter body so that the ejector surface of the at least one ejector body is oriented substantially transverse to the at least one tray groove with the lower sidewall of the at least one food item facing substantially away from the at least one tray groove, and subsequently move the at least one ejector body back into the forward position, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove, after which the user may insert a stick substantially perpendicularly into the lower sidewall of the at least one food item.

18. A method for producing a plurality of uniformly shaped and sized food items from a volume of food material using the food item formation apparatus of claim 1, the method comprising the steps of:

(a) positioning the volume of food material on the substantially flat surface;

(b) rolling the volume of food material to be substantially flat until the volume of food material has a desired thickness;

(c) manually moving the at least one ejector body into the forward position relative to the corresponding at least one cutter body;

(d) manually pressing the cutting edge of the at least one cutter body into and through the volume of food material until the cutting edge of the at least one cutter body comes into contact with the substantially flat surface on which the volume of food material is positioned, forming within the at least one cutter body the at least one food item having the cutout shape while simultaneously contacting the ejector surface and moving the at least one ejector body into the retracted position;

(e) lifting the cutter body away from the volume of food material;

(f) moving the at least one cutter body overtop of the at least one elongate tray groove of the tray, and orienting the least one cutter body so that the ejector surface of the at least one ejector body is oriented substantially transverse to the at least one tray groove with the lower sidewall of the at least one food item facing substantially away from the at least one tray groove;

(g) manually moving the at least one ejector body into the forward position relative to the corresponding at least one cutter body, causing the ejector surface to eject the food item from the first opening of the at least one cutter body and into the at least one tray groove in a substantially vertical orientation, with the upper sidewall, along with at least a portion of the left sidewall and right sidewall, of the at least one food item positioned in contact with the tray groove, such that the lower sidewall of the at least one food item remains substantially uncontacted and unobstructed by the tray groove;

(h) inserting a stick substantially perpendicularly into the lower sidewall of the at least one food item; and (i) repeating steps (d)-(h) as desired, or until the volume of food material has been completely used, whichever comes first.

* * * * *